United States Patent [19]

Göckler et al.

[11] 4,327,439

[45] Apr. 27, 1982

[54] METHOD FOR GENERATING MODEM TRANSMISSION SIGNALS WITH QUADRATURE AMPLITUDE MODULATION

[75] Inventors: Heinz Göckler, Backnang; Hagen Hofmeister, Korb, both of Fed. Rep. of Germany

[73] Assignee: Licentia-Patent-Verwaltungs-G.m.b.H., Frankfurt am Main, Fed. Rep. of Germany

[21] Appl. No.: 136,733

[22] Filed: Apr. 2, 1980

[30] Foreign Application Priority Data

Apr. 5, 1979 [DE] Fed. Rep. of Germany ....... 2913669

[51] Int. Cl.³ .......................... H03K 7/10; H04L 5/12
[52] U.S. Cl. ........................................ 375/67; 375/39; 375/42; 375/53; 375/54; 332/17
[58] Field of Search ...................... 332/16 R, 17, 23 A, 332/41, 43 R, 43 B; 375/39, 42, 44, 47, 59, 62, 64, 52, 53, 54, 67, 84, 94

[56] References Cited

U.S. PATENT DOCUMENTS

| | | | |
|---|---|---|---|
| 3,887,768 | 6/1975 | Forney, Jr. et al. | 375/39 X |
| 3,925,611 | 12/1975 | Dennis | 375/39 |
| 3,955,141 | 5/1976 | Lyon et al. | 375/39 |
| 4,247,944 | 1/1981 | Sifford | 375/94 |
| 4,271,527 | 6/1981 | Armstrong | 375/39 |

*Primary Examiner*—Benedict V. Safourek
*Attorney, Agent, or Firm*—Spencer & Kaye

[57] ABSTRACT

A method for generating modem transmission signals with quadrature amplitude modulation (QAM) wherein scanned values of elementary bandpass signals are stored in digitally coded form, the elementary bandpass signals are weighted with coefficients depending on the information to be transmitted and the modem transmission signals are formed by superposition of the thus weighted elementary bandpass signals; and wherein in the case of n-PSK modulation, where n=4, 8, 12, 16 . . . , the phase positions of all elementary bandpass signals are selected such that the phase diagram is symmetrical to the axis $\phi=0$, and no elementary bandpass signal coincides with the axis $\phi=0$; $\frac{1}{8}$n elementary bandpass signals, which cannot be derived from any other bandpass signal of phase diagram neither due to symmetry with the axis $\phi=0$ or the axis $\phi=90°$, respectively, nor by symmetry to the origin of the diagram, are stored in a digital memory; and the remaining, e.g. $\frac{3}{8}$n, elementary bandpass signals are obtained by weighting the stored elementary bandpass signals with +1 or −1, respectively, and/or reading out the memory in a forward or a backward direction, respectively.

9 Claims, 10 Drawing Figures

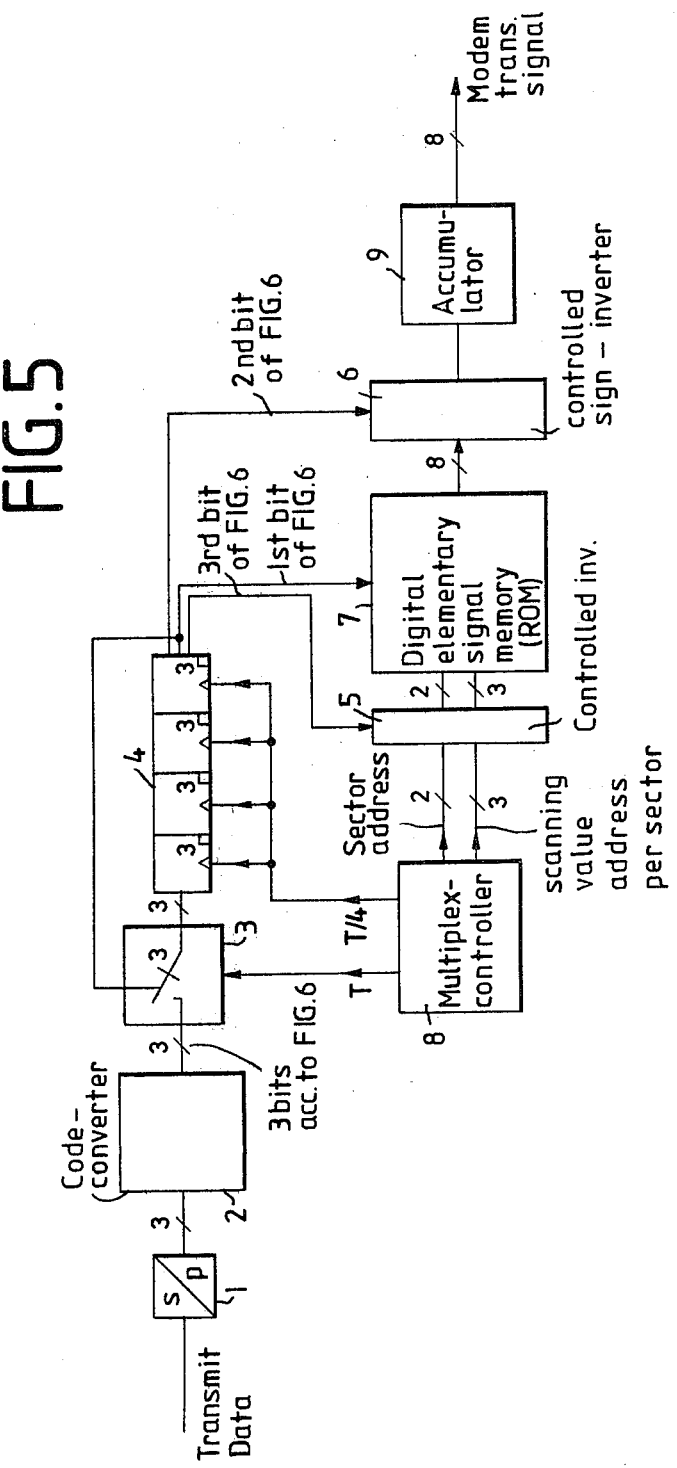

METHOD FOR GENERATING MODEM TRANSMISSION SIGNALS WITH QUADRATURE AMPLITUDE MODULATION

BACKGROUND OF THE INVENTION

The present invention relates to a method for generating modem transmission signals with quadrature amplitude modulation (QAM) in which scanned values of elementary bandpass signals are formed in digitally coded form, the elementary bandpass signals are weighted with coefficients depending on the information to be transmitted and the modem transmission signals are formed by superposition of the thus weighted elementary bandpass signals.

In an article by H. Schenk, "Entwurf optimaler Sendesignale für digitale Datensender bei beliebigen linearen Modulationsformen" [A new design method of digital data transmission signals for available linear modulation forms], AEÜ [Archiv für Elektronik und Übertragungstechnik, Electronics and Communication] Volume 31, No. ⅙, 1977, pages 261-266, there is described the manner in which the transmission signals of modems with linear modulation are derived in a simple manner from two elementary signals without the use of filters and modulators. In this article it is presumed that the two elementary signals are perpendicular to one another and the remaining elementary signals can be derived by superposing these orthogonal signals. This superposition generally includes at least one addition and one multiplication. For example, for an 8-PSK (Phase Shift Keying) system according to the prior art as shown in FIG. 1a wherein the elementary bandpass signals $e_0$ and $e_{90}$ are stored, the elementary signal $e_{45}$ is found as shown below $$e_{45} = \frac{1}{\sqrt{2}} (e_0 + e_{90}) \qquad (1)$$

In equation (1) $e_0$ is the elementary signal at $\phi=0°$, $e_{90}$ is the elementary signal at $\phi=90°$, and $e_{45}$ is the elementary signal at $\phi=45°$.

The derivation of, for example, the elementary signal $e_{45}$ thus requires an addition and a multiplication which can be realized only with additional technical expenditures and moreover, the speed of the circuit is reduced with this measure.

Additionally, if in the above example the factor $1/\sqrt{2}$ and the signals $e_0$ and $e_{90}$ are each available with a word length of 8 bits and the digital/analog converter at the output of the modem transitter is also designed for 8 bits, then $e_{45}$ must be rounded off to 8 bits, producing additional rounding errors.

SUMMARY OF THE INVENTION

It is therefore the object of the present invention to provide a method for generating modem transmission signals which operates with less calculating operations and thus enables the circuit to operate at a greater speed and with greater accuracy. One variation of the method is realizable at 8-PSK without additional storage spaces and at 4-PSK with less storage expenditures than was possible in the prior art systems.

The above object is accomplished according to one embodiment of the invention in that in a method for generating modem transmission signals with quadrature amplitude modulation (QAM) wherein scanned or sample values of elementary bandpass signals are stored in digitally coded form, the elementary bandpass signals are weighted with coefficients depending on the information to be transmitted and the modem transmission signals are formed by superposition of the thus weighted elementary bandpass signals, and in the case of n-PSK modulation wherein n=4, 8, 12, 16 . . . , the phase positions of all elementary bandpass signals are selected such that the phase star (i.e., the two dimensional, four quadrant phase diagram or signal space) is symmetrical to the axis $\phi=0$, and no elementary bandpass signal coincides with the axis $\phi=0$; ¼n elementary bandpass signals, which cannot be derived from any other elementary bandpass signal of the phase diagram neither due to symmetry with the axis $\phi=0$, nor the axis $\phi=90°$, respectively, nor by symmetry to the origin of the diagram, are stored in a digital memory; and the remaining elementary bandpass signals are obtained by one of the following:

(a) reading one of the stored signals out of the digital memory in a forward direction and weighting same with a $-1$ coefficient, (b) reading one of the stored signals out by the digital memory in a backward direction and weighting same with a $+1$ coefficient, and (c) reading one of the stored signals out of the digital memory in a backward direction and weighting same with a $-1$ coefficient.

The above object is achieved according to a second embodiment of the invention in that in a method for generating modem transmission signals with quadrature amplitude modulation (QAM) as mentioned above and, in the case of n-PSK modulation where n=8, 12, 16 . . . , the phase positions of all elementary bandpass signals are selected such that the phase star or diagram is symmetrical to the axis $\phi=0$ with one elementary bandpass signal lying on the axis $\phi=0$; ¼n+1 elementary bandpass signals which cannot be derived from any other elementary bandpass signal of the phase diagram neither due to symmetry with the axis $\phi=0$ nor the axis $\phi=90°$, respectively, nor by symmetry to the origin of the diagram, are stored in a digital memory; and, the remaining elementary bandpass signals are obtained by one of the following:

(a) reading one of the stored signals out of the digital memory in a forward direction and weighting same with a $-1$ coefficient, (b) reading one of the stored signals out of the digital memory in a backward direction and weighting same with a $+1$ coefficient, and (c) reading one of the stored signals out of the digital memory in a backward direction and weighting same with a $-1$ coefficient.

According to a further feature of the two embodiments of the invention, an additional number of elementary bandpass signals, which correspond to a mirror image about the axes $\phi=0$ or $\phi=90°$ of the phase star of at least some of the initially stored bandpass signals, are stored so that the memory need only be read out in one direction whereby all of the elementary bandpass signals for the system are obtained by simply reading one of the stored signals in the forward direction and weighting same with a $+1$ or a $-1$, as required.

According to another feature of the embodiments of the invention, in the case of m-ASK/n-PSK, where m=2, 3, 4, . . . , and ASK is amplitude shift keying, the elementary bandpass signals are additionaly weighted with factors corresponding to the amplitude stages characteristic for the information to be transmitted.

Finally, according to still a further feature of the invention, in the case of an m-ASK/n-PSK, where m=2, 3, 4 . . ., and n=8, 12, 16 . . ., according to the second embodiment of the invention, and additional $(nm/2) - \frac{1}{4}n - 1$ signals, which correspond to a mirror image about the axis $\phi = 0$ or $\phi = 90°$ of the phase star of at least some of the initially stored bandpass signals, are stored in the digital memory, whereby all of the elementary bandpass signals are obtained by simply reading out the memory in a forward direction and by weighting with a +1 or a −1, as required, and no amplitude weighting need be effected outside of the memory.

BRIEF DESCRIPTION OF THE DRAWINGS

FIG. 5 shows as an example the block diagram of 8-PSK system, according to the invention.

DETAILED DESCRIPTION OF THE PREFERRED EMBODIMENTS

Figure 1A:
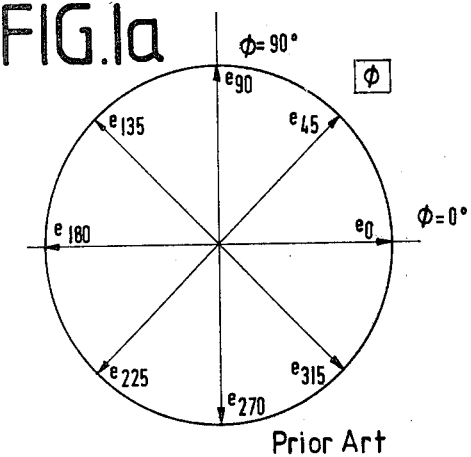
FIG. 1a shows the phase star or diagram of a prior art 8-PSK system.
Figure 1B:
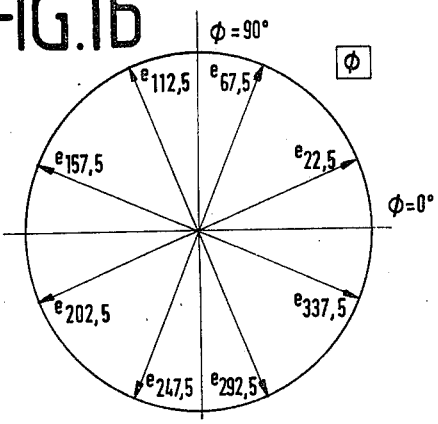
FIG. 1b shows the phase star of an 8-PSK system as it is used in the method according to the present invention.

The method according to the present invention is based on the present fact that, in the example of the n-PSK system, wherein n=8 shown in FIG. 1b, only $\frac{1}{4}n$, i.e. two, elementary signals e.g., $e_{22.5}$ and $e_{67.5}$ are being stored for which there are two other elementary signals i.e. $e_{292.5}$ and $e_{337.5}$ which lie symmetrically to the axis $\phi = 0$, and no elementary bandpass signal coincides with the axis $\phi = 0$. The elementary signal $e_{-22.5} = e_{337.5}$ consists of exactly the same scanning values as $e_{22.5}$, only the sequence of the arrangement of the scanning values is different. Thus, the signals $e_{292.5}$ and $e_{337.5}$ can be derived simply by reading the stored scanning values for the signals $e_{67.5}$ and $e_{22.5}$, respectively, out of the memory in a backwards direction. If the elementary signals consist, for example, of N scanning values (k=1 (1) N), then the following relationships apply:

$$e_{112.5}(k) = -e_{67.5}(N-k+1) \quad (2)$$

$$e_{157.5}(k) = -e_{22.5}(N-k+1) \quad (3)$$

$$e_{202.5}(k) = -e_{22.5}(k) \quad (4)$$

$$e_{247.5}(k) = -e_{67.5}(k) \quad (5)$$

$$e_{292.5}(k) = e_{67.5}(N-k+1) \quad (6)$$

$$e_{337.5}(k) = e_{22.5}(N-k+1) \quad (7)$$

The expression k=1(1) N means that the counting index k runs from 1 through N by steps of 1. For example, let N=32 and k=5, then $e_{337.5}$ (k 0 5) = $e_{22.5}$ (28) according to equation (7).

Thus, it can easily be seen that by storing the scanning values for only two of the bandpass signals, e.g., signals $e_{22.5}$ and $e_{67.5}$ the remaining $\frac{3}{4}n = 6$ signals are obtained by either (a) reading out the stored signals in a forward direction and weighting same with a −1 to obtain two further signals, e.g., the signals $e_{202.5}$ and $e_{247.5}$, respectively;

(b) reading out the stored signals in a backward direction and weighting same with a −1 to obtain two other signals, e.g., the signals $e_{157.5}$ and $e_{112.5}$, respectively;

(c) reading out the stored signals in a backward direction and weighting same with a +1 to obtain still two further signals, e.g., the signals $e_{337.5}$ and $e_{292.5}$, respectively.

Consequently, in the derivation of the remaining elementary signals from the stored elementary signals the arithmetic operations and the signal errors connected therewith in the prior art methods are no longer encountered.

Figure 2A:
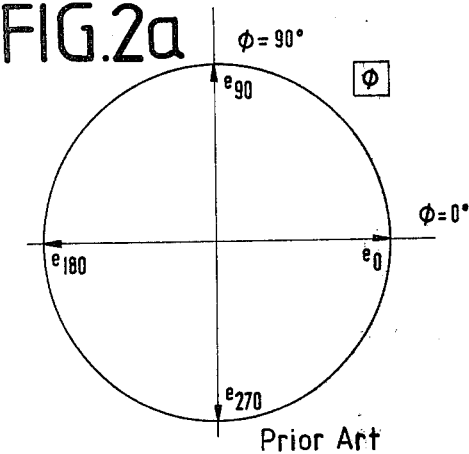
FIG. 2a shows the phase star of a 4-PSK system according to the prior art.
Figure 2B:
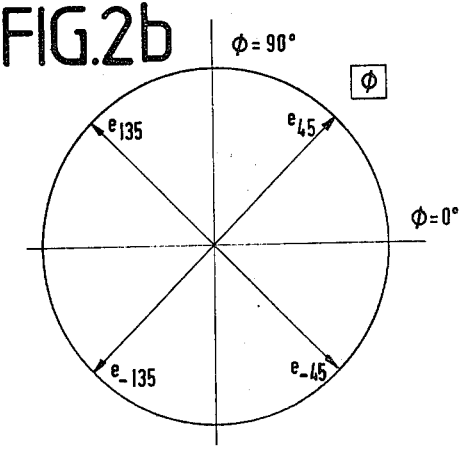
FIG. 2b shows the phase star of a 4-PSK system as it is used in the method according to the present invention.

Moreover, contrary to the need in a 4-PSK system, according to the prior art as shown in FIG. 2a of storing two elementary bandpass signals, in a 4-PSK system according to the present invention as shown in FIG. 2b, only one elementary signal, e.g., $e_{45}$, need be stored. This signifies a considerable simplification and an improvement in signal quality because only one elementary signal need be approximated for a given requirement. The remaining $\frac{3}{4}n = 3$ elementary bandpass signals are obtained as described above for the 8-PSK system.

The phase differences between any two signals represented by the arrows in FIGS. 1–3 must all be identical, if the probalities of the symbols to be transmitted (weighting coefficients) are all the same, as is generally assumed. Therefore, for an n-PSK/m-ASK system the general relation for the phase difference applies $$\Delta\phi = (360°/n)$$

e.g. $\Delta\phi = 45°$ for n=8.

The signals to be stored need not be in the first quadrant. On the other hand, the signals to be stored must be independent of each other. Consider, e.g., relationships (2) through (7) for an 8-PSK system and FIG. 1b; possible combinations for storage are, for example:

| | | |
|---|---|---|
| 1. | $e_{22.5}$, | $e_{67.5}$ |
| 2. | $e_{112.5}$, | $e_{157.5}$ | each of the same quadrant
| 3. | $e_{202.5}$, | $e_{247.5}$ |
| 4. | $e_{292.5}$, | $e_{337.5}$ |
| 5. | $e_{22.5}$, | $e_{112.5}$ |
| 6. | $e_{22.5}$, | $e_{247.5}$ | each of different quadrants
| 7. | $e_{22.5}$, | $e_{292.5}$ |

On the contrary, according to, e.g., relationship (7), $e_{337.5}$ is derived from $e_{22.5}$, and therefore this combination is not allowed. Moreover, the same holds for $e_{157.5}$ and $e_{202.5}$ with respect to $e_{22.5}$, which are only replicas of $e_{22.5}$ multiplied by a −1.

For a 12-PSK $\Delta\phi = 30°$. Any quadrant signals, none of them coinciding with the $\phi = 0$ nor the $\phi = 90°$-axis, may be used if the phase star is rotated according e.g., to FIG. 1b.

Possible signal combinations for storage in the memory (minimum number).

| 1. | $e_{15}$, $e_{45}$, $e_{75}$ | 1. | quadrant |
| 2. | $e_{15}$, $e_{135}$, $e_{165}$ | 1./2. | quadrant |
| 3. | $e_{45}$, $e_{105}$, $e_{345}$ | 1./2./4. | quadrant | and so on.

The same reasoning holds as above concerning not allowed signal combinations for storage.

If it is desired to avoid the need for using memories which are read out in both directions and to use memories which are read out in only the forward direction then, in addition to the initially stored $\frac{1}{4}n$ elementary bandpass signals, an additional $\frac{1}{4}n$ elementary bandpass signals are stored. The additional signals are selected such that in the phase star of the system they constitute a mirror image about the axes $\phi=0$ or $\phi=90°$ of the initially stored bandpass signals. For example, in the 8-PSK systems shown in FIG. 1b wherein $e_{22.5}$ and $e_{67.5}$ are initially stored, the additionally stored signals are either the signals $e_{337.5}$ and $e_{292.5}$, which constitute the respective mirror images about the axis $\phi=0$ of the two initially stored signals, or the signals $e_{157.5}$ and $e_{112.5}$, which constitute the respective mirror images about the axis $\phi=90°$ of the two initially stored signals. In a similar manner with the 4-PSK system of FIG. 2b, either the signal $e_{-45}$ or $e_{135}$ would additionally be stored.

Figure 3A:
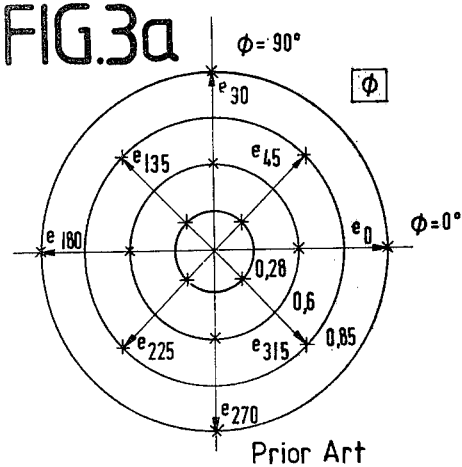
FIG. 3a shows the phase star of an 8-PSK/4-ASK system according to the prior art.
Figure 3B:
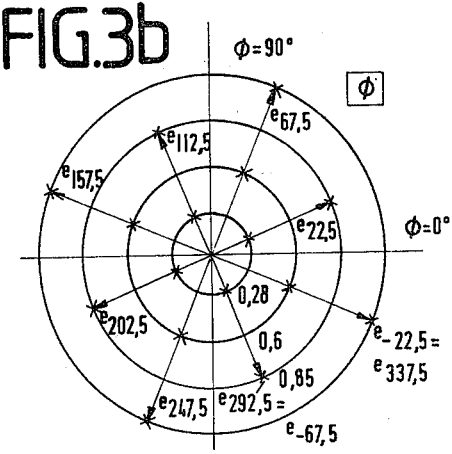
FIG. 3b shows the phase star of an 8-PSK/4-ASK system as used in the method according to the present invention.
Figure 4:
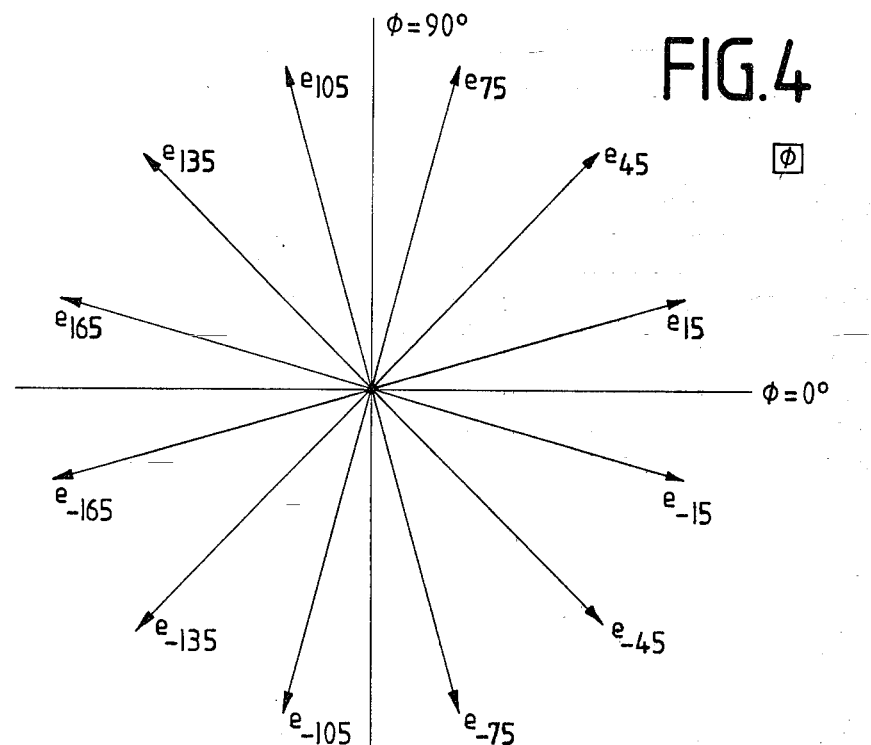
FIG. 4 shows a rotated phase star for a 12-PSK system.

In addition to use in n-PSK systems, the present invention is also applicable to n-PSK/m-ASK systems wherein m-ASK is m-level amplitude shift keying, m=2, 3, 4 ... and n=4, 8, 12 .... For example, with an 8-PSK/2-ASK system as shown in FIGS. 3a and 3b, the present invention provides the advantage that at least the addition required in the prior art method can be eliminated. That is, according to the prior art method, and with a phase star as shown in FIG. 3a, the stored elementary bandpass signals are $e_0$ and $e_{90}$, and the signal $e_{45}$ is derived as follows:

$$e_{45} = 0.85(e_0 + e_{90}) \tag{8}$$

However, with a phase star as shown in FIG. 3b according to the present invention in which signals $e_{22.5}$ and $e_{67.5}$ are stored, signal $e_{-22.5}$ is obtained as follows:

$$e_{-22.5}(k) = (1/0.85)e_{22.5}(N-k+1) \tag{9}$$

That is, the signal $e_{22.5}$ is read out backwards, weighted with a +1 and multiplied by the factor corresponding to the appropriate amplitude stage. As with the simple n-PSK system, the need for using memories which can be read out backwards can also be avoided in this type of system by simply storing an additional $\frac{1}{4}n$ signals which are selected as described above.

According to a further embodiment of the invention, improvements with respect to signal quality and reduced calculating work are possible for n-PSK systems, where n=8, 12, 16..., and for m-ASK/n-PSK systems, where m=2, 3, 4, ..., and n=8, 12, 16 ..., with a variation of the described method even if the bases are nonrotated phase stars as shown in FIG. 1a or 3a, respectively. That is, a phase star which is symmetrical to the axis $\phi=0$ and has one elementary bandpass signal lying on the axis $\phi=0$. In the case of an n-PSK system having a nonrotated phase star, instead of storing only $\frac{1}{4}n$ elementary bandpass signals as described above with respect to FIG. 1b, $\frac{1}{4}n+1$ elementary bandpass signals are stored. Consequently, in the case of an 8-PSK system having a phase star as shown in FIG. 1a, in addition to the elementary bandpass signals $e_0$ and $e_{90}$, which are stored according to the prior art method, the elementary bandpass signal $e_{45}$ for example is stored. The remaining $\frac{3}{4}n-1$ elementary bandpass signals can now be obtained or derived from these three stored signals in the manner described above with respect to FIG. 1b. In a corresponding manner, this variation may be utilized for a 2-ASK/8-PSK system by storing only the signals $e_0$, $e_{45}$ and $e_{90}$ with one or two amplitude stages, and deriving the remaining signals from same in the above-described manner.

The use of memories which are read out backward can likewise be avoided with this variation of method by storing additional elementary bandpass signals. In particular, in this embodiment or variation of the invention $\frac{1}{4}n-1$ additional elementary bandpass signals which correspond to a mirror image of at least one of the initially stored bandpass signals about the axis $\phi=0$ or the axis $\phi=90°$ of the phase star are stored. For example, with the 8-PSK system of FIG. 1a, wherein the signals $e_0$, $e_{45}$ and $e_{90}$ are initially stored, only one additional signal need be stored and this additional signal may be either $e_{315}$, which is the mirror image of $e_{45}$ about the axis $\phi=0$, or $e_{135}$ which is the mirror image of $e_{45}$ about the axis $\phi=90°$. In a similar manner, the use of only forward readout of memories may be utilized with an m-ASK/n-PSK system where m=2, 3, 4 ... and n=8, 12, 16 ....

According to a further modification of the method described above with respect to FIG. 3a, not only is the need for reading out the memories in a backward direction avoided, but moreover, the need for weighting the readout signals outside of the memory is avoided, thus further increasing the speed and reliability and decreasing the round-off error of the system. This is accomplished in the case of an m-ASK/n-PSK system, with m=2, 3, 4 ... and n=8, 12, 16 ..., having a nonrotated phase star as shown, for example, in FIG. 3a, by storing, in addition to the stored $\frac{1}{4}n+1$ elementary bandpass signals discussed above with respect to FIGS. 1a and 3a, a further $(\frac{1}{4}n+1)$ $(m-1)+(\frac{1}{4}n-1)$ m=(nm/2)−$\frac{1}{4}$−1 elementary bandpass signals. In particular, the additional signals are chosen so that the additional $\frac{1}{4}n-1$ signals result from a mirror image about the axis $\phi=0$, or $\phi=90°$ of at least one of the initially recorded signals and each of these signals is stored with its amplitude states. For example, with the 2-ASK/8-PSK system of FIG. 3a, in addition to the initially stored signals $e_0$, $e_{45}$ and $e_{90}$, the signal $e_{315}$ or $e_{135}$ would be stored, with each of these four signals being individually stored with its two different amplitude states, i.e., a total of eight signals. The remaining eight possible signals would then be obtained by reading out one of the stored signals and weighting some with a −1.

FIG. 5 shows the block diagram of a preferred realization of the method and apparatus for generation of modem transmission signals, e.g., for an 8-PSK system according to CCITT Recommendation V. 27. The data to be transmitted are serially fed into a serial to parallel converter 1, which combines any three subsequent data bits to a three bit word, as described by the CCITT Recommendation V. 27 bis "Orange book" Vol. VIII. 1.

Figure 6:
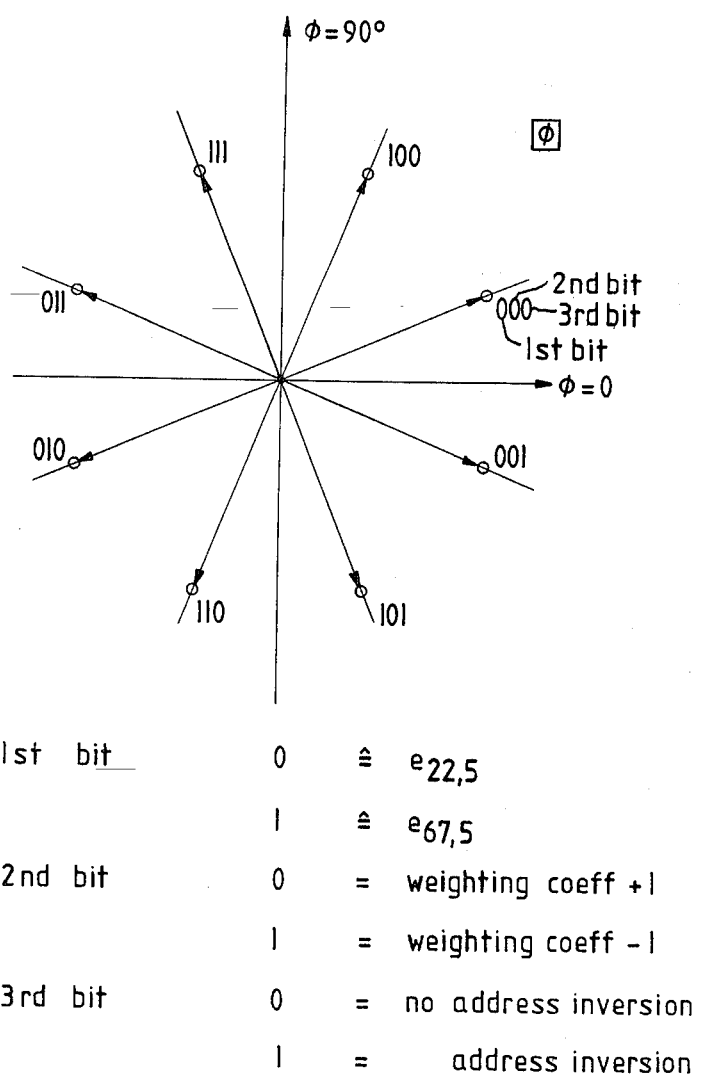
FIG. 6 shows the coding scheme for embodiment of FIG. 5.

The subsequent code converter 2 converts these three bit words to a code as listed in FIG. 6. These 3-bit words are fed into a memory 4 of "1" 3-bit words after passing a multiplexing switch 3.

Figure 7:
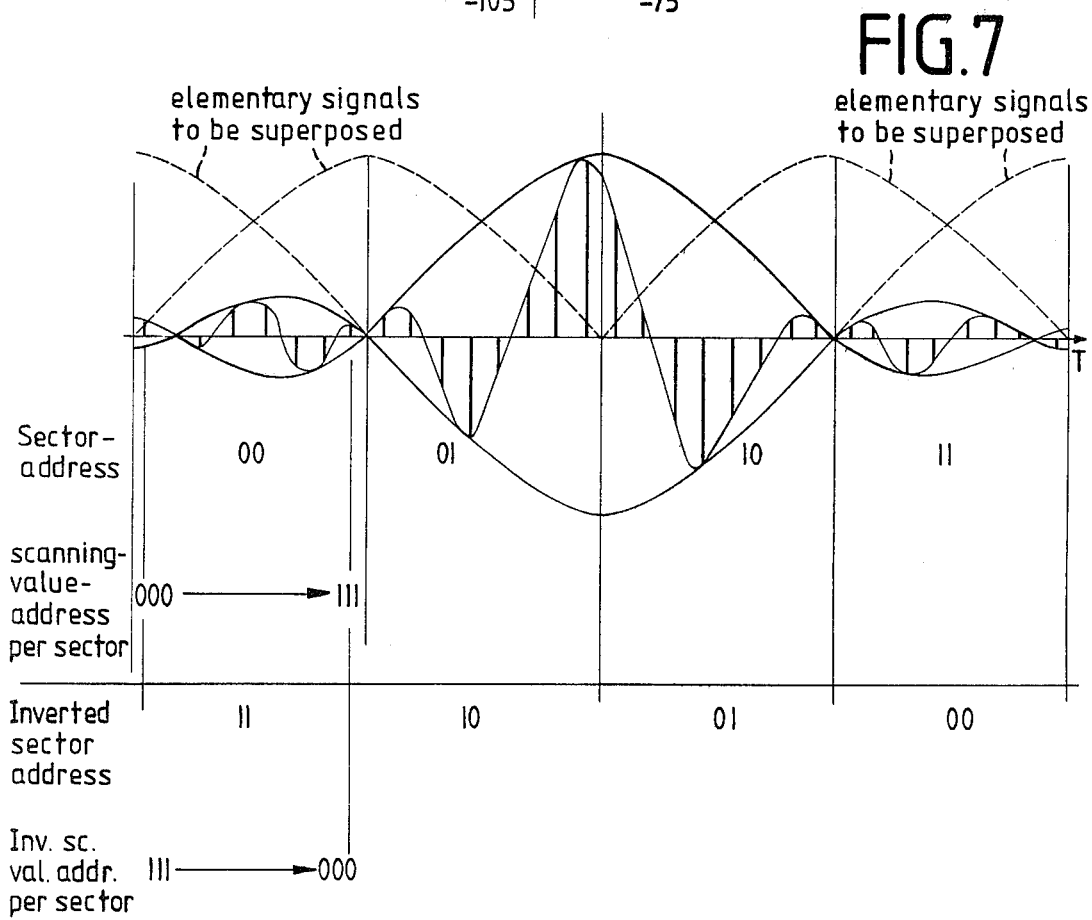
FIG. 7 shows an example of an elementary signal for a system as described in FIG. 5.

"1" is the number of elementary signals to be superposed according to FIG. 7. In FIG. 5, e.g. is "1"=4.

For superposition of the scanning values the content of memory 4 is circulated in order to select the correct elementary signal out of the signal memory 7 and to control the address inverter 5 and the sign inverter 6.

The address of the scanning value of each elementary signal and the sector adress according to FIG. 7 is generated by the multiplex controller 8. The "1"=4 scanning values to be superposed are added to each other in the accumulator 9. The digital modem transmission signal delivered by the accumulator 9 may be processed subsequently, e.g., by a digital to analog converter. A similar 8-PSK system is shown in "Wiss. Ber. AEG-TELEFUNKEN", Vol. 51, pp. 231–245, No. 4/5, 1978.

It will be understood that the above description of the present invention is susceptible to various modifications, changes and adaptations, and the same are intended to be comprehended within the meaning and range of equivalents of the appended claims.

What is claimed is:

1. In a method for generating modem transmission signals with quadrature amplitude modulation (QAM) wherein sample values of elementary bandpass signals are stored in digitally coded form, and including weighting the elementary bandpass signals with coefficients depending on the information to be transmitted and forming the modem transmission signals by superposition of the thus weighted elementary bandpass signals, the improvement, in the case of n-PSK modulation wherein n=4, 8, 12, 16 . . . , comprising the steps of: selecting the phase positions of the elementary bandpass signals such that the two dimensional four quadrant phase diagram is symmetrical to the axis $\phi=0$, and no elementary bandpass signal coincides with the axis $\phi=0$; storing $\frac{1}{4}$n elementary bandpass signals, which cannot be derived from any other bandpass signal of said phase diagram neither due to symmetry with the axis $\phi=0$, or the axis $\phi=90°$, respectively, nor by symmetry to the origin of said phase diagram, in a digital memory; and obtaining the remaining elementary bandpass signals by one of the following:
   (a) reading one of the stored signals out of the digital memory in a forward direction and weighting same with a $-1$ coefficient,
   (b) reading one of the stored signals out of the digital memory in a backward direction and weighting same with a $+1$ coefficient, and
   (c) reading one of the stored signals out of the digital memory in a backward direction and weighting same with a $-1$ coefficient.

2. The method of claim 1 wherein said remaining elementary bandpass signals comprise $\frac{3}{4}$n signals.

3. In a method for generating modem transmission signals with quadrature amplitude modulation (QAM) wherein sample values of elementary bandpass signals are stored in digitally coded form, and including weighting the elementary bandpass signals with coefficients depending on the information to be transmitted and forming the modem transmission signals by superposition of the thus weighted elementary bandpass signals, the improvement, in the case of n-PSK modulation where n=8, 12, 16 . . . , comprising the steps of: selecting the phase positions of the elementary bandpass signals so that the two dimensional four quadrant phase diagram is symmetrical to the axis $\phi=0$ with one of the elementary bandpass signals lying on the axis $\phi=0$; storing $\frac{1}{4}$n+1 elementary bandpass signals, which cannot be derived from any other bandpass signal of said phase diagram neither due to symmetry with the axes $\phi=0$ or $\phi=90°$, respectively, nor by symmetry to the origin of said phase diagram, in a digital memory; and obtaining the remaining elementary bandpass signals by one of the following:
   (a) reading one of the stored signals out of the digital memory in a forward direction and weighting same with a $-1$ coefficient,
   (b) reading one of the stored signals out of the digital memory in a backward direction and weighting same with a $+1$ coefficient, and
   (c) reading one of the stored signals out of the digital memory in a backward direction and weighting same with a $-1$ coefficient.

4. The method defined in claim 3 wherein said remaining elementary bandpass signals comprise $\frac{3}{4}$n−1 signals.

5. In a method for generating modem transmission signals with quadrature amplitude modulation (QAM) wherein samples of elementary bandpass signals, which may be of longer duration than the duration of a symbol to be transmitted, are stored in digitally coded form, with the inherent phase and amplitude of the stored elementary bandpass signals depending on the potential coded information symbols to be transmitted, and forming the modem transmission signals by superposition of elementary bandpass signals selected according to the information to be transmitted, the improvement, in the case of n-PSK modulation wherein n=4, 8, 12, 16 . . . , comprising the steps of: rotating the elementary bandpass signals plottable as points on a two dimensional four quadrant signal space diagram such that these signals are symmetrically arranged with respect to the axis $\phi=0$ of this signal space diagram, and no elementary bandpass signal coincides with the axis $\phi=0$; storing $\frac{1}{4}$n elementary bandpass signals, which cannot be derived from any other elementary bandpass signal of the signal space neither due to symmetry with the axis $\phi=0$, or the axis $\phi=90°$, respectively, nor by symmetry to the origin of the signal space, in a digital memory; and obtaining the remaining elementary bandpass signals by one of the following:
   (a) reading one of the stored signals out of the digital memory in forward direction and weighting same with a $-1$ coefficient,
   (b) reading one of the stored signals out of the digital memory in a backward direction and weighting same with a $+1$ coefficient, and
   (c) reading one of the stored signals out of the digital memory in a backward direction and weighting same with a $-1$ coefficient.

6. In a method for generating modem transmission signals with quadrature amplitude modulation (QAM) wherein samples of elementary bandpass signals, which may be of longer duration than the duration of a symbol to be transmitted, are stored in digitally coded form, with the inherent phase and amplitude of the stored elementary bandpass signals depending on the potential coded information symbols to be transmitted, and forming the modem transmission signals by superposition of elementary bandpass signals selected according to the information to be transmitted, the improvement, in the case of n-PSK modulation where n=8, 12, 16 . . . , comprising the steps of: rotating the elementary bandpass signals plottable as points on a two dimensional four quadrant signal space diagram such that these signals are symmetrically arranged with respect to the axis $\phi=0$ of this signal space diagram with one of the elementary bandpass signals lying on the axis $\phi=0$; storing $\frac{1}{4}n+1$ elementary bandpass signals which cannot be derived from any other elementary bandpass signal of the signal space neither due to symmetry with the axes $\phi=0$ or $\phi=90°$, respectively, nor by symmetry to the origin of the signal space diagram, in a digital memory; obtaining the remaining elementary bandpass signals by one of the following:
  (a) reading one of the stored signals out of the digital memory in a forward direction and weighting same with a $-1$ coefficient,
  (b) reading one of the stored signals out of the digital memory in a backward direction and weighting same with a $+1$ coefficient, and
  (c) reading one of the stored signals out of the digital memory in a backward direction and weighting same with a $-1$ coefficient.

7. The method defined in claim 1 or 5 wherein in the case of n PSK with an additional m-level amplitude shift keying (m ASK) modulation, where m=2, 3, 4 and n=4, 8, 12, 16..., said method includes the further step of additionally weighting the elementary bandpass signals with factors corresponding to the amplitude states which are characteristic for the information to be transmitted.

8. Method as defined in claim 3 or 5 wherein the case of n PSK with an additional m-level amplitude shift keying (m ASK) modulation where m=2, 3, 4... and n=8, 12, 16..., said method includes the further step of additionally weighting the elementary bandpass signals with factors corresponding to the amplitude states which are characteristic for the information to be transmitted.

9. The method as defined in claim 3 or 6 wherein in the case of n-PSK with an additional m-level amplitude shift keying (m ASK) modulation, where m=2, 3, 4... and n=8, 12, 16..., said method includes the further step of storing an additional $$(\tfrac{1}{4}n+1)(m-1)+(\tfrac{1}{4}n-1)m=(nm/2)-\tfrac{1}{2}n-1$$

elementary bandpass signals corresponding to a mirror image about the axis $\phi=0$ or the axis $\phi=90°$ of said phase diagram of the elementary bandpass signals defined in claim 5 with m amplitude stages in the case of m-ASK/n-PSK modulation, whereby the memory need be read out only in a forward or a backward direction.

* * * * *